United States Patent [19]

Taubitz et al.

[11] Patent Number: 4,751,268

[45] Date of Patent: Jun. 14, 1988

[54] MODIFIED CARBOXYL-CONTAINING POLYPHENYLENE ETHER RESINS

[75] Inventors: Christof Taubitz, Wachenheim; Erhard Seiler, Lugwigshafen; Lothar Schlemmer, Maxdorf, all of Fed. Rep. of Germany

[73] Assignee: BASF Aktiengesellschaft, Ludwigshafen, Fed. Rep. of Germany

[21] Appl. No.: 929,427

[22] Filed: Nov. 12, 1986

[30] Foreign Application Priority Data

Nov. 13, 1985 [DE] Fed. Rep. of Germany ....... 3540118

[51] Int. Cl.$^4$ ............................................. C08L 71/04
[52] U.S. Cl. .................................... 525/132; 525/392; 525/905
[58] Field of Search ................ 525/132, 185, 905, 392

[56] References Cited

U.S. PATENT DOCUMENTS 4,097,556 6/1978 Toyama et al. .
4,283,511 8/1981 Ueno et al. .
4,287,321 9/1981 Olander .
4,338,410 7/1982 Ueno et al. .

*Primary Examiner*—Theodore E. Pertilla
*Attorney, Agent, or Firm*—Keil & Weinkauf

[57] ABSTRACT

A process for the preparation of modified polyphenylene ether resins by grafting fumaric acid, preferably at from 270° to 350° C., onto polyphenylene ethers which are mixed with vinylaromatic polymers, and modified polyphenylene ether resins consisting of from 4.95 to 95 parts by weight of polyphenylene ether, from 95 to 4.95 parts by weight of vinylaromatic polymer and from 0.05 to 10 parts by weight of grafted fumaric acid.

5 Claims, No Drawings

MODIFIED CARBOXYL-CONTAINING POLYPHENYLENE ETHER RESINS

The present invention relates to a process for the preparation of modified polyphenylene ether resins by grafting an olefinically unsaturated compound onto a polyphenylene ether which is mixed with polymers of vinylaromatic compounds, and the modified polyphenylene ether resins I.

Polymers of this type are high molecular weight substances in which side chains of olefinically unsaturated compounds are subsequently grafted onto molecular chains which have been obtained beforehand by polycondensation.

It is known that maleic anhydride can be grafted onto polymers such as polyethylene, polypropylene, polystyrene, butadiene polymers, ethylene/propylene copolymers, etc. by graft polymerization (cf. B. C. Trivedi and B. M. Culbertson in Maleic Anhydride, chapter 11, pages 459–478, Plenum Press, New York [1982]). The preparation of polyphenylene ether/maleic anhydride graft polymers has also been described in the literature (cf. U.S. Pat. Nos. 4,287,321, 4,338,410 and 4,097,556 and EP-A-17939). The disadvantage of the known graft polymerization processes using maleic anhydride is the fact that the latter is toxic and expensive metering means have to be employed in order to avoid harm to health and environmental pollution. These disadvantages are particularly serious in the case of grafting in the melt zone of an extruder when the starting materials are fed into the extruder via metering apparatuses.

It is an object of the present invention to avoid the disadvantages described above and to provide a process which gives a higher grafting yield on polymers of carboxyl-containing polyphenylene ether resins.

We have found that this object is achieved by processes as claimed in claims 1 to 4 and by polyphenylene ether resins as claimed in claim 5.

The polyphenylene ethers present in the modified polyphenylene ether resins are obtained by conventional processes, by oxidative coupling of phenols which are disubstituted in the ortho-position by alkyl (cf. U.S. Pat. Nos. 3,661,848, 3,219,625, 3,378,505, 3,306,874, 3,306,875 and 3,639,656). The unsubstituted or alkyl-substituted polyphenylene ethers are preferably compatible with vinylaromatic polymers.

Polymers are regarded as compatible with one another if they are substantially or completely soluble in one another (cf. A. Noshay, Block Copolymers, Academic Press [1977], pages 8–10, and O. Olabisi, Polymer-polymer Miscibility, Academic Press [1979], pages 117–189).

Examples of compatible polyphenylene ethers are poly-(2,6-diethyl-1,4-phenylene) ether, poly-(2-methyl-6-ethyl-1,4-phenylene) ether, poly-(2-methyl-6-propyl-1,4-phenylene) ether, poly-(2,6-dipropyl-1,4-phenylene) ether, poly-(2-ethyl-6-propyl-1,4-phenylene) ether and copolymers such as those which contain 2,3,6-trimethylphenol, as well as polymer blends. However, poly-(2,6-dimethyl-1,4-phenylene) ether is particularly preferred.

The polyphenylene ethers are generally high molecular weight substances, the weight average molecular weight ($M_w$) being from 10,000 to 80,000, in particular from 15,000 to 60,000.

The polyphenylene ethers are present in the modified polyphenylene ether resins in amounts of from 95 to 4.95, preferably more than 50, parts by weight.

The olefinically unsaturated monomer is fumaric acid. Because the substance is solid, has a high melting point and is nontoxic, it can be particularly advantageously metered. The fumaric acid is generally used in pure form.

It is preferably subjected to the graft polymerization in an amount of from 0.05 to 10, in particular from 0.1 to 5, parts by weight.

In addition to fumaric acid, it is also possible to employ other monomers which are capable of undergoing graft polymerization onto the polyphenylene ether and possess olefinic double bonds.

The fumaric acid is subjected to graft polymerization in the presence or absence of a free radical initiator, which is preferably an organic peroxide or an azo compound. Such substances are familiar to the skilled worker.

Examples are 1,1-di-tert-butyl-peroxy-3,3,5-trimethylcyclohexane, tert-butyl peroxyisopropylcarbonates, tert-butyl peroxy-3,3,5-trimethylhexanoates, tert-butyl peracetate, tert-butyl-perbenzoate, n-butyl 4,4-di-tert-butyl-peroxyvalerate, 2,2-di-tert-butyl-peroxybutane, dicumyl peroxide, tert-butyl cumyl peroxide, 1,3-bis-(tert-butylperoxyisopropyl)-benzene and di-tert-butyl peroxide.

Organic peroxides whose decomposition has a half-life [cf. Modern Plastics 36 [1959], [6], 142–148) of from 1 to 30 seconds at 200° C. are preferred. The choice of the free radical initiator depends on the desired reaction temperature.

A mixture of from 30 to 90% by weight of an inorganic carrier and from 10 to 70% by weight of an organic peroxide is preferred, the carrier preferably being finely divided clay or chalk, and the organic peroxide dicumyl peroxide.

Where the reaction temperature is above 200° C. and the reaction time is adequate, the initiator may be omitted; if necessary, it may be present in amounts of less than 10, preferably less than 5%, by weight. In a preferred procedure, graft polymerization is carried out at above 200° C. in the polymer melt, without the addition of a free radical initiator.

The mixtures furthermore contain vinylaromatic polymers which are compatible with the polyphenylene ether.

Vinylaromatic polymers of this type are described by, for example, O. Olabisi in Polymer-polymer Miscibility, Academic Press (1979), pages 224–230 and 245. Particularly suitable vinylaromatic polymers are those which consist of styrene, chlorostyrene, α-methylstyrene, p-methylstyrene or, in minor amounts, (methyl)acrylonitriles (preferably less than 8% by weight). Polystyrene is preferably used.

The weight average molecular weight ($M_w$) of the vinylaromatic polymers is from 1500 to 2,000,000, particularly preferably from 70,000 to 1,000,000.

The polymers can be prepared by the conventional polymerization methods, such as mass polymerization, suspension polymerization, emulsion polymerization or solution polymerization.

The vinylaromatic polymers are present in the polyphenylene ether resin in amounts of from 95 to 4.95, particularly preferably more than 50, parts by weight.

The components are preferably mixed thoroughly in the form of polymer melts at from 170° to 350° C., preferably from 240° to 300° C. A twin-screw extruder is preferably used for this purpose. The residence time is in general from 0.5 to 10, preferably from 1 to 5, minutes.

The components are preferably metered in together and melted in a melting zone. The extruder screw in the melting zone preferably contains kneading elements. The melting zone is followed by the reaction zone, which preferably contains kneading elements and additional kneading elements having a backward-conveying thread. A devolatilization zone for removing the volatile components is preferably located upstream of the product discharge. The discharged melt is generally granulated.

The granules have a variety of uses.

The modified resins according to the invention can be modified in a conventional manner. They may contain, for example, reinforcing agents and fillers, in particular glass fibers, flameproofing agents, stabilizers, lubricants, dyes and pigments. Examples of suitable reinforcing agents are glass fibers, glass spheres, kaolin, quartz, glimmer, wollastonite, talc, asbestos, titanium dioxide, alumina, micovite, chalk and calcined aluminum silicate.

The novel resins can be used as adhesion promoters. They are also useful as engineering materials, films, thin adhesive layers, hot melt adhesives and coatings.

Examples 1 to 4 illustrate the preparation, according to the invention, of the modified polyphenylene ether resins.

Comparative Example 1 describes a mixture without polystyrene, the products obtained being highly crosslinked and therefore useless; comparative Example 2 concerns a mixture in which maleic anhydride is used instead of fumaric acid. Apart from the disadvantage of the toxicity of maleic anhydride compared with non-toxic fumaric acid, a much smaller amount of maleic anhydride is incorporated into the modified resin.

Comparative Example 3 describes a mixture without a polyphenylene ether. Although the blend is not crosslinked, only a very small amount of fumaric acid is incorporated into it.

EXAMPLE 1

94 parts by weight of poly-(2,6-dimethyl-1,4-phenylene)ether (PPE) having a relative viscosity of 0.63, measured in 1% strength by weight $CHCl_3$ solution at 25° C., 13.5 parts by weight of polystyrene (PS 144 C from BASF, MFI 200/5.0=24 g/10 min) and 2.5 parts by weight of fumaric acid are metered into a twin-screw extruder (ZSK 53) from Werner and Pfleiderer, and are melted in a first zone, using kneading elements, at 255° C., then reacted at 265° C. in a second zone while kneading and using graduated kneading elements, and thereafter devolatilized in a devolatilization zone at 255° C. under reduced pressure. The mean residence time in the extruder is 2.5 minutes. The melt which emerges is passed through a water bath and granulated, and the granules are dried. The granules are insoluble in toluene to an extent of 4% by weight and contain 1.6% by weight of fumaric acid.

COMPARATIVE EXAMPLE 1

97.5 parts by weight of PPE from Example 1 and 2.5 parts by weight of fumaric acid are extruded as in Example 1.

The granules obtained are insoluble in toluene to an extent of 65% by weight and are therefore substantially crosslinked, which is a disadvantage.

COMPARATIVE EXAMPLE 2

84 parts by weight of PPE according to Example 1 and 13.5 parts by weight of polystyrene are reacted with 2.5 parts by weight of maleic anhydride as described in Example 1. Because of the toxicity of maleic anhydride, the process section of the extruder, including the feed zone, has to be provided with a particularly expensive extraction system in order to avoid environmental pollution and danger to health. This is a disadvantage. The granules obtained are insoluble in toluene to an extent of 6% by weight and contain 0.7% by weight of maleic anhydride.

EXAMPLE 2

80 parts by weight of PPE according to Example 1, 18.8 parts by weight of polystyrene (PS 143 E from BASF, MFI 200/5.0=9 g/10 min.) and 1.2 parts by weight of fumaric acid are melted at 270° C., reacted at 275° C. and devolatilized at 270° C., these steps being carried out as described in Example 1. The mean residence time is 3 minutes. The granules are insoluble in toluene to an extent of 6% by weight and contain 0.8% by weight of fumaric acid.

EXAMPLE 3

85 parts by weight of PPE according to Example 1, 14 parts by weight of polystyrene (PS 144 C from BASF, MFI 200/5.0=24 g/10 min.) and 1.0 part by weight of fumaric acid are melted at 280° C., reacted at 265° C. and devolatilized at 265° C., the steps being carried out as described in Example 1. The mean residence time is 3 minutes. The granules are insoluble in toluene to an extent of 4% by weight and contain 0.7% by weight of fumaric acid.

EXAMPLE 4

30 parts by weight of PPE according to Example 1, 68 parts by weight of polystyrene (PS 143 E from BASF, MFI 200/5.0=9 g/10 min.) and 2.0 parts by weight of fumaric acid are melted at 230° C., reacted at 260° C. and devolatilized at 240° C., these steps being carried out as described in Example 1. The mean residence time is 3 minutes. The granules are insoluble in toluene to an extent of 3% by weight and contain 1.0% by weight of fumaric acid.

COMPARATIVE EXAMPLE 3

98 parts by weight of polystyrene (according to Example 4) and 2 parts by weight of fumaric acid are reacted as described in Example 4. The granules are insoluble in toluene to an extent of 3% by weight and contain 0.1% by weight of fumaric acid.

We claim:

1. In a process for the preparation of a modified polyphenylene ether resin by grafting an olefinically unsaturated compound onto a polyphenylene ether which is mixed with a vinylaromatic polymer, the improvement which consists essentially of using fumaric acid as the olefinically unsaturated compound, which is subjected to graft polymerization in the presence or absence of a free radical initiator.

2. The process of claim 1, wherein graft polymerization is carried out at from 170° to 350° C.

3. The process of claim 1, wherein graft polymerization is carried out at a polymer melt temperature of above 200° C. and without the addition of a free radical initiator.

4. The process of claim 1, wherein the graft polymerization ia carried out in a reaction zone of an extruder, which zone is provided with kneading elements.

5. A modified polyphenlene ether resin prepared by the process of claim 1, and which consists of from 4.95 to 95 parts by weight of polyphenylene ether, from 95 to 4.95 parts by weight of a vinylaromatic polymer and from 0.05 to 10 parts by weight of grafted fumaric acid.

* * * * *